(12) United States Patent
Gaebelein et al.

(10) Patent No.: US 8,859,988 B1
(45) Date of Patent: Oct. 14, 2014

(54) METHOD FOR COUPLING A LASER BEAM INTO A LIQUID-JET

(71) Applicants: Jens Guenter Gaebelein, Freienfeld/Campo di Trens (IT); Jeroen Hribar, Luzern (CH); se2quel Management GmbH, Mühlacker (DE)

(72) Inventors: Jens Guenter Gaebelein, Freienfeld (IT); Jeroen Hribar, Luzern (CH)

(73) Assignees: Jens Guenter Gaebelein, Freienfeld/Campo di Trens (IT); Jeroen Hribar, Luzern (CH); se2quel Management GmbH, M hlacker (DE)

( * ) Notice: Subject to any disclaimer, the term of this patent is extended or adjusted under 35 U.S.C. 154(b) by 0 days.

(21) Appl. No.: 14/291,006

(22) Filed: May 30, 2014

(51) Int. Cl.
*B23K 26/14* (2014.01)
*B23K 26/16* (2006.01)
*B23K 26/36* (2014.01)

(52) U.S. Cl.
CPC ............. *B23K 26/1417* (2013.01); *B23K 26/36* (2013.01); *B23K 26/16* (2013.01)
USPC .... 250/432 R; 250/435; 250/438; 219/121.84

(58) Field of Classification Search
CPC .......................................... B23K 26/00–26/42
USPC ........... 250/428, 432 R, 435, 438; 219/121.6, 219/121.61, 121.8, 121.85; 347/47; 83/53; 210/748.06
See application file for complete search history.

(56) References Cited

U.S. PATENT DOCUMENTS

| | | | | |
|---|---|---|---|---|
| 4,497,692 A | * | 2/1985 | Gelchinski et al. | ............. 205/92 |
| 5,902,499 A | * | 5/1999 | Richerzhagen | ........... 219/121.84 |
| 8,206,018 B2 | * | 6/2012 | Chen | ............................. 362/553 |
| 8,581,141 B2 | * | 11/2013 | Muratsubaki et al. | ... 219/121.67 |

* cited by examiner

*Primary Examiner* — Samuel M Heinrich
(74) *Attorney, Agent, or Firm* — Tue Nguyen

(57) ABSTRACT

Reliable coupling of a high-power laser beam into a liquid-jet in a liquid-jet guided laser system can be achieved with high lifetime performance of the nozzle and the protection window, through setting the parameters of the liquid-jet guided laser system according to an optimum relationship that links the focus point of the laser, the focus cone angle, the laser beam energy distribution profile and the nozzle geometry.

20 Claims, 10 Drawing Sheets

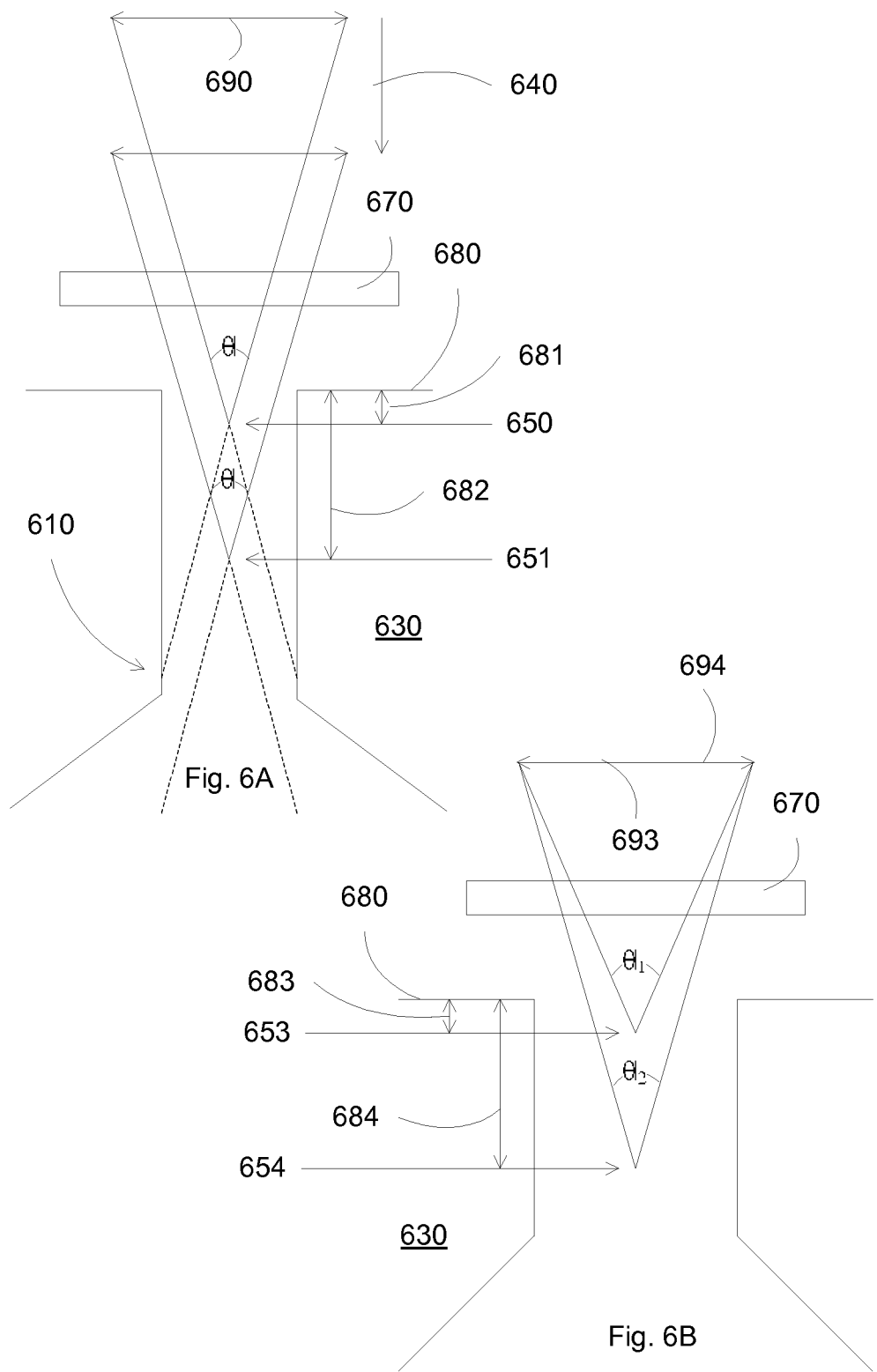

METHOD FOR COUPLING A LASER BEAM INTO A LIQUID-JET

BACKGROUND

Light guiding inside a liquid-jet, also of laser light with an energy level below a material damage threshold, is a well-known effect, and does not require a precise alignment of the light into the liquid-jet.

To perform material treatment of a work piece using a liquid-jet guided laser beam, the laser power however must exceed the damage threshold of the work piece material. In such case exact focus alignment of the laser beam into the liquid-jet, as well as hydrodynamic effects of the liquid-jet play a very important role and must be considered accurately.

For exploitation of the technology in industrial environments that require manless 3-shift operation it is extremely important that the liquid-jet laser process is able to operate stable for a long uninterrupted time while applying a high laser power for treatment of the work piece.

Without the right focus alignment, the energy level of a laser in many is so high, that the nozzle, which creates the liquid-jet, and/or the protection window, which closes the liquid stagnation space and thru which the laser is focused into the liquid-jet, will be destroyed either immediately or after a very short number of working hours; hence the right kind of optical focus alignment as well as hydrodynamic considerations must be followed.

Thus there is a need for methods that allow reliable coupling of a high-power laser beam into a liquid-jet while significantly increasing the lifetime of the nozzle and the protection window.

SUMMARY OF THE DESCRIPTION

In some embodiments, the present invention discloses methods that can allow reliable coupling of a high-power laser beam into a liquid-jet while significantly increasing the lifetime of the nozzle and the protection window. The methods include setting the parameters of the liquid-jet guided laser system according to an optimum relationship that links the focus point of the laser, the focus cone angle, the laser beam profile and the nozzle geometry.

In some embodiments, the focus point of the liquid-jet guided laser system is set to be below the nozzle inlet plane and separated from the nozzle inlet plane a distance less than twice the diameter of the nozzle.

BRIEF DESCRIPTION OF THE DRAWINGS

FIGS. 6A-6B illustrate different mechanisms for large focus distances according to some embodiments.

DETAILED DESCRIPTION OF THE PREFERRED EMBODIMENTS

In some embodiments, the present invention relates to a liquid-jet guided laser system, which provides a laser beam confined in a liquid jet.

Laser technology is applied for a large variety of material processing tasks, such as cutting, drilling, welding, marking, engraving and material ablation. Nearly all materials can be processed e.g. metals, metal alloys, ceramics, diamonds, synthetic diamonds, carbon fibers, sapphire, quartz, glass, plastics and more. In almost every case, the laser light is focused into a very small spot onto the work piece using a focusing lens to enable the processing task by exceeding the damage threshold of the work piece material. The work piece therefore has to be precisely aligned into the laser focus throughout the processing task.

In liquid-jet guided laser technology, the laser focus is coupled to a thin liquid-jet. By doing so, the laser focus energy stays contained throughout the length of the liquid-jet. The coupling takes place in a so-called coupling unit. The coupling unit typically consists of a metal chamber that on the side of the focusing lens is closed with a laser protection window. On the opposite side the chamber carries a nozzle. Liquid provided to the coupling unit flows between window and nozzle and leaves the nozzle in form of a liquid-jet. The energy of the laser spot in the focal plane is captured inside the liquid-jet and guided to the work piece inside the liquid-jet. This method eliminates the necessity to control the distance of the work piece precisely because the required energy to perform the processing is available throughout the laminar length of the liquid-jet. Any liquid that provides suitable light guide capabilities can be used to form the liquid-jet.

Figure 1A:
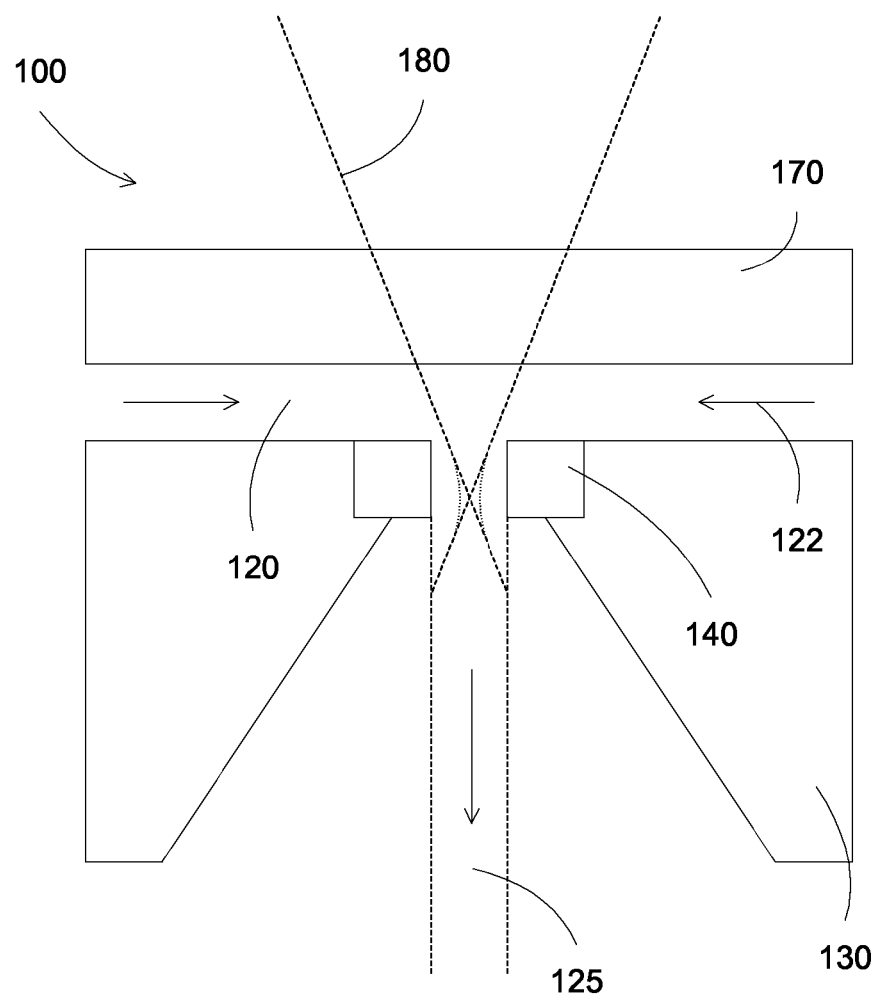
FIGS. 1A-1B illustrate a liquid-jet guided laser system according to some embodiments.
Figure 1B:
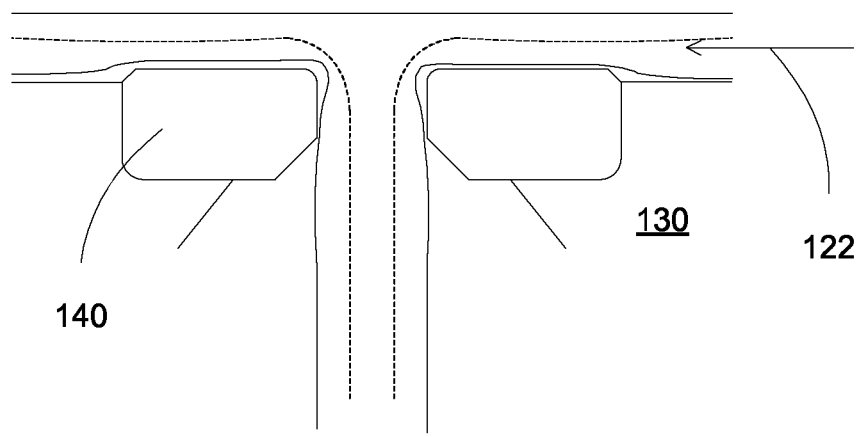

FIGS. 1A-1B illustrate a liquid-jet guided laser system according to some embodiments. In FIG. 1A, the liquid-jet guided laser system 100 can include a chamber 120, which is configured to guide a liquid flow 122. The chamber 120 can have the shape of a disk, with an inlet at a peripheral portion to accept a liquid input. The chamber 120 can include an opening for direct the liquid flow to form a liquid jet 125. At one side of the chamber 120 is a nozzle, which includes a nozzle stone 140 and a nozzle tip 130. The nozzle stone 140 can be used to control the size of the liquid jet 125. The nozzle tip 130 can be used to guide and protect the liquid jet.

The liquid-jet guided laser system 100 can include a protection window 170, which can locate at an opposite side of the chamber 120. The protection window is included to separate the dry environment of the laser beam with the liquid environment of the liquid jet. A laser beam 180 can be focused on the liquid portion, such as on the liquid jet 125. The laser beam can be confined in the liquid jet due to internal reflection.

FIG. 1B shows a schematic flow pattern of the liquid jet, with the solid line indicating a boundary flow path and the dashed line indicating a center flow path. The boundary flow path can experience the change in the topology of the flow conduit, for example, at and around the nozzle stone 140, before settling to a laminar flow a distance away from the nozzle stone 140.

In some embodiments, the present invention discloses methods, and systems formed by the methods and/or operating the methods, to improve operations of a liquid-jet guided laser system. The methods can provide a guide line for building and operating a liquid-jet guided laser system in its optimum conditions. For example, given a liquid-jet guided laser system, the methods can operate the liquid-jet guided laser system at an optimum configuration, such as minimum power loss or maximum component lifetime. In addition, the methods can also offer guidance in component replacements and modifications to obtain desired operation requirements, such as operating at a high laser power or at a long term reliability.

In some embodiments, the present invention discloses methods to couple a high power laser beam into a liquid-jet, without exceeding the damage threshold of the nozzle and strongly reducing laser exposure to the protection window (less exposed energy can lead to longer lifetime). For example, the methods can allow coupling of greater-than 150 mJ of a 1064 nm laser into an 80 μm nozzle and achieve a lifetime of greater-than 250 hours for the laser protection window and the nozzle. The methods can present a significant increase in durability, e.g., compared to prior art methods, and can allow true unattended 3-shift operation that is required in industrial environments.

In some embodiments, the present invention discloses operating conditions for maximizing laser power transfer, e.g., maximizing cutting power of the liquid-jet guided laser beam, while protecting the components, such as the protection window and the nozzle (nozzle stone and nozzle tip) from the laser beam.

The protection window and the nozzle can be damaged by the laser, such as damages to the protection window due to a high laser density, e.g., a high laser power that passes through the small area of the protection window, or damages to the nozzle due to a high laser power impacting a top portion, a sidewall, or a bottom portion of the nozzle.

In some embodiments, the present invention discloses methods to protect the protection window from the laser beam, which can increase the lifetime of the protection window in the liquid-jet guided laser system. A laser beam, when passing through the protection window, can cause damages to the protection window if the laser power density exceeds a laser damage threshold. A typical laser damage threshold for a protection window is 10-15 $J/cm^2$ at 1064 nm wavelength. Thus, for a prior art focus scheme with 0.0855 $mm^2$ laser spot size on the bottom side of the laser protection window, the maximum energy that this spot can contain to stay within the 10 $J/cm^2$ criteria is only 8.55 mJ. However for material treatment of the work piece, in particular for very deep cuts, a much higher energy is needed.

In some embodiments, the present invention discloses balancing the laser power and the laser spot size to provide improved protection to the protection window. For example, a larger laser spot size for a same laser power can provide a better lifetime performance of the protection window. In addition, a larger laser spot size can allow the usage of a larger laser power without damaging the protection window.

Figure 2A:
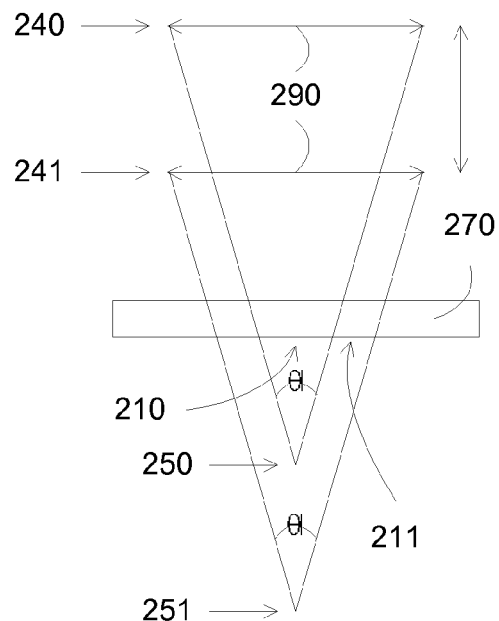
FIGS. 2A-2D illustrate optical systems for a laser beam of a liquid-jet guided laser system according to some embodiments.

FIGS. 2A-2D illustrate optical systems for a laser beam of a liquid-jet guided laser system according to some embodiments. In FIG. 2A, different focus points can be used to provide different laser spot sizes, e.g., different power densities, on the protection window. For example, moving a focus lens 290 from location 240 (with focus point 250) to location 241 (with focus point 251) closer to the protection window 270 can increase the laser spot size, e.g., from spot size 210 to spot size 211, leading to lower laser power density, and better lifetime performance of the protection window. Thus for a same focus cone angle θ, a focus point away from the protection window 270 can provide better protection for the protection window, due to larger spot size and thus lower laser power density.

Figure 2C:
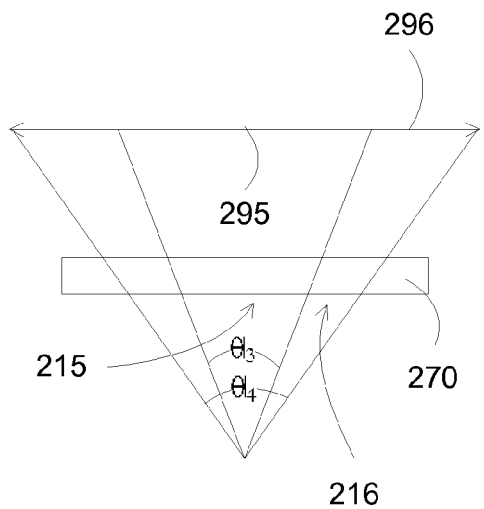
Figure 2B:
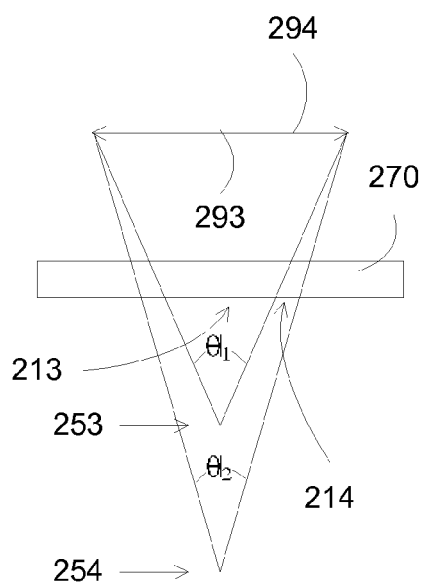

In FIG. 2B, different focus lenses can be used to provide different laser spot sizes, e.g., different power densities, on the protection window. For example, replacing focus lens 293 having focus cone angle $\theta_1$ (with focus point 253) to focus lens 294 having focus cone angle $\theta_2$ (with focus point 254) can increase the laser spot size, e.g., from spot size 213 to spot size 214, leading to lower laser power density, and better lifetime performance of the protection window. Thus for different focus cone angles, a focus point away from the protection window 270 can provide better protection for the protection window.

In FIG. 2C, different focus lenses can be used to provide different focus cone angle, and thus different laser spot sizes, e.g., different power densities, on the protection window. For example, replacing focus lens 295 having focus cone angle $\theta_3$ to focus lens 296 having focus cone angle $\theta_4$ can increase the laser spot size, e.g., from spot size 215 to spot size 216, leading to lower laser power density, and better lifetime performance of the protection window. Thus for a same focus point, larger focus cone angle θ can provide better protection for the protection window.

Figure 2D:
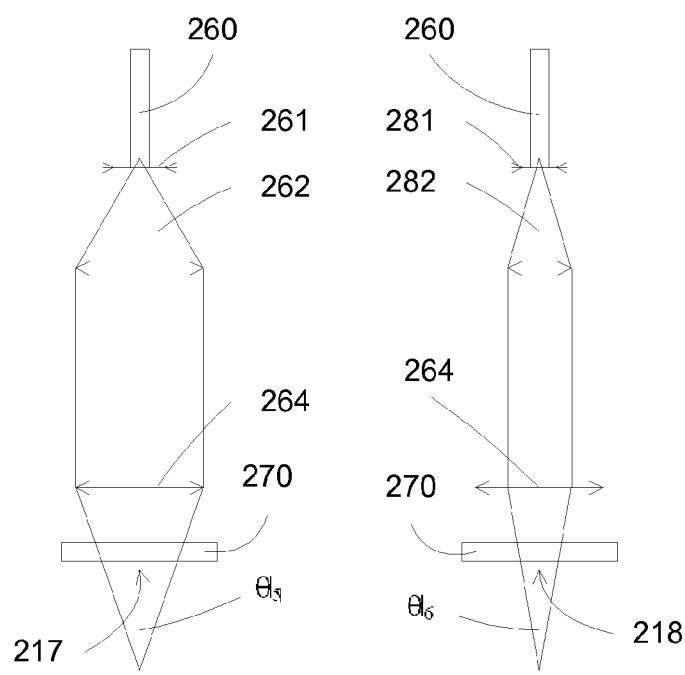

In FIG. 2D, different optical assemblies can be used to provide different laser spot sizes, e.g., different power densities, on the protection window. A narrow laser beam 260 can be widen, for example, by beam spreading optics 261/281. Different beam spreading optic assemblies 261/281 can be used, forming laser beams 262/282 with different beam widths. A same focus lens 264 can be used, with different laser spot sizes 217/218 (e.g., different power densities, on the protection window. For example, the wider laser beam 262 can impact the protection window at a large area 217, resulting in low power density, leading to a better lifetime performance of the protection window. In contrast, the narrow laser beam 282 can impact the protection window at a small area 218, resulting in high power density, leading to a poorer lifetime performance of the protection window. The spot sizes can be characterized by the laser cone angles $\theta_5$ or $\theta_6$, with larger laser cone angle $\theta_5$ having larger laser spot size 217, leading to better lifetime performance for the protection window.

In some embodiments, the present invention discloses methods to widen a laser beam passing through a protection window, e.g., widen the laser spot size caused by the laser beam, to improve a lifetime performance of the protection window. Alternatively, the laser beam width can be selected to achieve a lifetime performance of the protection window.

The large laser spot size can be achieved by a deeper focus point (e.g., focus point 251 as compared to focus point 250) for a same focus cone angle (see FIGS. 2A and 2B). The large laser spot size can be achieved by a larger focus cone angle (e.g., focus cone angle $\theta_5$ as compared to focus cone angle $\theta_6$) for a same focus point (see FIGS. 2C and 2D).

In some embodiments, the beam width characteristic of a laser beam impacting a protection window can be characterized by a numerical aperture (NA) of the focus lens, which links the laser cone angle θ with the index of refraction n of the ambient. An optical assembly for the laser beam can be constructed to satisfy the numerical aperture requirement of a focus lens. The constructed optical assembly is not unique, and different optical assemblies can be constructed for a same numerical aperture.

In some embodiments, numerical aperture is used for characterizing the beam width characteristic of a laser beam impacting a protection window. However, the invention is not so limited, and other specifications can be used, such as a laser beam spot size on the protection window by the laser beam, or the laser cone angle θ.

In some embodiments, the present invention discloses methods, and optical assemblies forming from the methods, to form optical assemblies to improve a lifetime performance of the protection window. The optical assemblies can be characterized, and constructed, by a numerical aperture values. For example, to improve a lifetime of a protection window, a high numerical aperture for the focus lens of the liquid-jet guided laser system can be selected.

In some embodiments, the present invention discloses methods for configuring parameters of a liquid-jet guided laser system, including selecting a numerical aperture for a focus lens, e.g., selecting an optical assembly for the laser beam, of the liquid-jet guided laser system.

The numerical aperture can be selected based on a power input requirement for a job. For example, to cut a thick material, a high laser power can be required, for example, to melt and evaporate the material. However, a high laser power can potential damage the protection window, for example, due to a high power density impacting the protection window. In some embodiments, the present invention discloses selecting an appropriate numerical aperture, e.g., selecting an appropriate optical assembly for the liquid-jet guided laser system, to minimize or to prevent damage to the protection window. For example, a high numerical aperture can be chosen so that the power density reaching the protection window can be lower than an acceptable power density for the protection window.

The numerical aperture can be selected based on a lifetime performance of the protection window. For example, a protection window can be rated for a maximum power density, e.g., a laser damage threshold value. Appropriate numerical aperture can be selected, depending on the laser power input, so that the power density of the laser beam reaching the protection window does not exceed the laser damage threshold.

In some embodiments, the present invention discloses methods to protect the nozzle from the laser beam. A laser beam can impact a top surface, a sidewall, or a bottom surface of the nozzle, potentially damaging the nozzle, reducing the lifetime of the nozzle in the liquid-jet guided laser system.

Figure 3A:
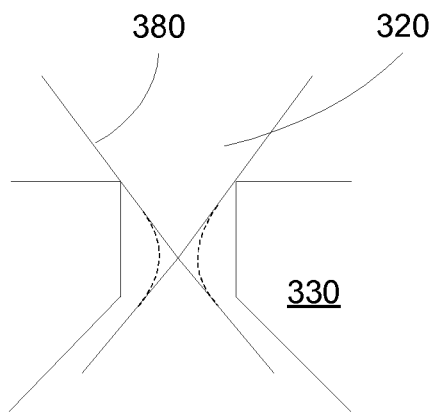
FIGS. 3A-3C illustrate schematics of nozzle damages according to some embodiments.
Figure 3B:
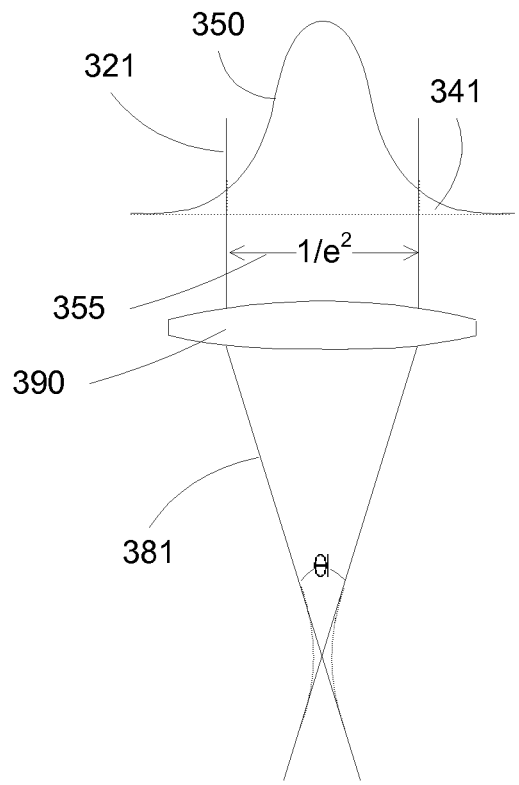
Figure 3C:
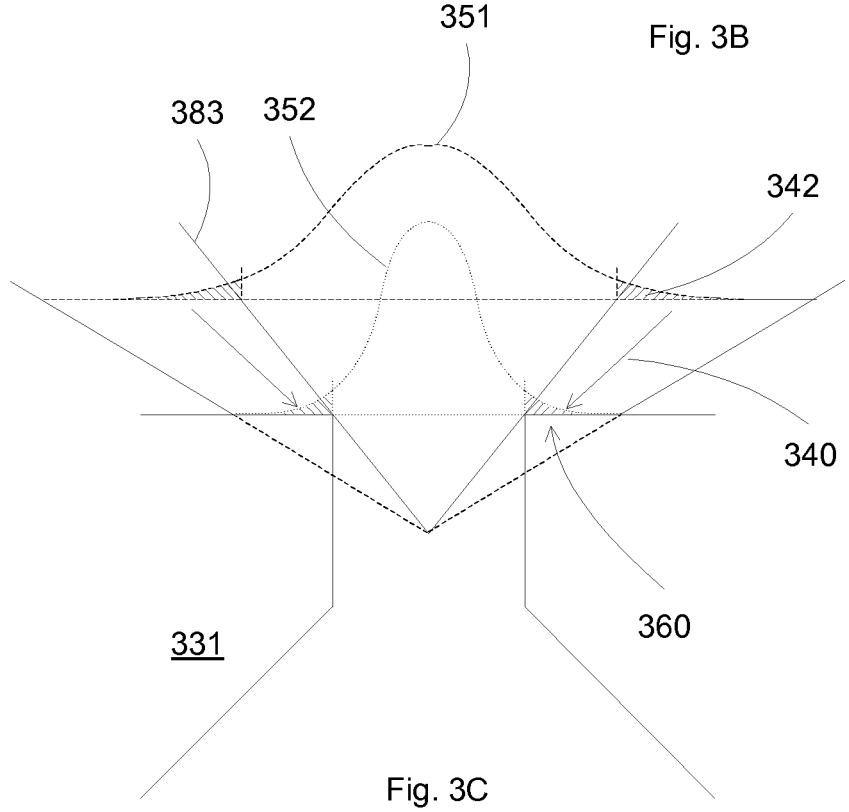

FIGS. 3A-3C illustrate schematics of nozzle damages according to some embodiments. A laser beam can be focused to the liquid area confined by the nozzle 330. The laser beam can pass through the inlet opening of the nozzle, then travel down the liquid jet with an internal reflection mechanism. To prevent damage to the components of the liquid-jet guided laser system, such as the laser protection window and the nozzle, the laser beam that is focused through the laser protection window and into the nozzle should not exceed the damage threshold of the nozzle and exposes the laser protection window to as little energy as possible. This can be achieved by taking into account the laser wavelength, laser power, the energy distribution in the laser beam, focal length and focus cone angle of the focusing lens as well as laser focus spot size.

In FIG. 3A, a laser beam 320 is focused to an area inside the nozzle opening. The laser beam can be characterized by geometric rays 380, denoting the laser beam width, which is confined within the opening, with no power impacting the nozzle. Lasers usually have a Gaussian energy distribution in the beam. For material treatment typically the 1/e² diameter of the laser beam is used. The transverse energy profile of the Gaussian beam can be described by:

$$I(r) = I_0 \exp\left(-2\frac{r^2}{r_0^2}\right)$$

where $I_0$ is the axial energy of the beam, r is the radius of a particular point in the beam and $r_0$ is the radius of the beam where energy is $$\frac{I_0}{e^2},$$

or 13.5% of its maximum intensity value.

For material treatment purpose the laser beam is focused into a small spot. This laser focus spot has the same Gaussian energy distribution. To achieve the smallest, diffraction limited laser focus spot, laser-focusing lenses are typically designed in such way that approximately 87% of their clear aperture is being illuminated with 1/e² Gaussian intensity distribution.

In FIG. 3B, a laser beam 321 is focused by a lens 390 with a focus cone angle θ. The laser beam 321 can have a Gaussian profile 350. The laser beam can be characterized by geometric rays 381, denoting the laser beam width, which is usually the 1/e² diameter 355 of the laser. As shown, a tail end portion 341 of the laser beam is positioned outside the geometric rays 381, signifying that the laser energy is not confined within the geometric rays denoting the laser beam width. In fact, using the definition of 1/e² beam width, about 87% of the laser energy is inside the laser beam width and about 13% of the laser energy is outside the laser beam width.

In FIG. 3C, a laser beam is focused to an area inside a nozzle 331. The laser beam can have a Gaussian profile 351 at a location far from the nozzle opening, and a narrower Gaussian profile 352 at the nozzle opening. Similar to FIG. 3A, geometric rays 383 can denote the beam width, which represents the 1/e² diameter of the laser beam. The tail end 342 portion of the Gaussian profile can impact 340 a top portion 360 of the nozzle, potential damaging the nozzle.

Thus a laser beam can typically have a gaussian power density profile, and therefore a portion of the tail end of the gaussian profile can impact on the nozzle material outside the nozzle inlet opening.

In some embodiments, the present invention discloses methods to limit the amount of laser power impacting a top portion of the nozzle to improve a lifetime performance of the nozzle.

In some embodiments, the laser beam can be characterized by the power density profile of the laser beam, such as gaussian or non-gaussian profiles. The power density profile of the laser beam can be used to calculate the amount of power impacting the nozzle material, e.g., the amount of power not passing the nozzle inlet opening. A lifetime performance of the nozzle can be related to the impact laser power, with higher impact power resulting in lower nozzle lifetime.

In some embodiments, the present invention discloses methods for configuring parameters of a liquid-jet guided laser system, including selecting an amount of laser power impacting the nozzle material. For example, high lifetime performance of the nozzle can be achieved by configuring the liquid-jet guided laser system so that the laser beam can impact the nozzle material at a limited power level, such as 1% or less of the power input, or less than 1 W power. For example, assuming a 100 W laser source, the amount of laser power impacting the nozzle material can be limited to less than 1% of the 100 W laser power, or less than 1 W laser power hitting the nozzle material. In some embodiments, limit of less than 1 W laser power can be used, regardless of the laser source. In some embodiments, other limits can be used, such as 2%, 5%, or 10% of the laser source, depending on the desired lifetime performance for the nozzle. Alternatively, In some embodiments, the present invention discloses using the density profile of the laser beam when evaluating the laser transmittance, e.g., from a laser source to the liquid jet. The reliability of the system can be related to a portion of the laser profile, e.g., the edge portion, that does not pass through the nozzle.

Figure 4A:
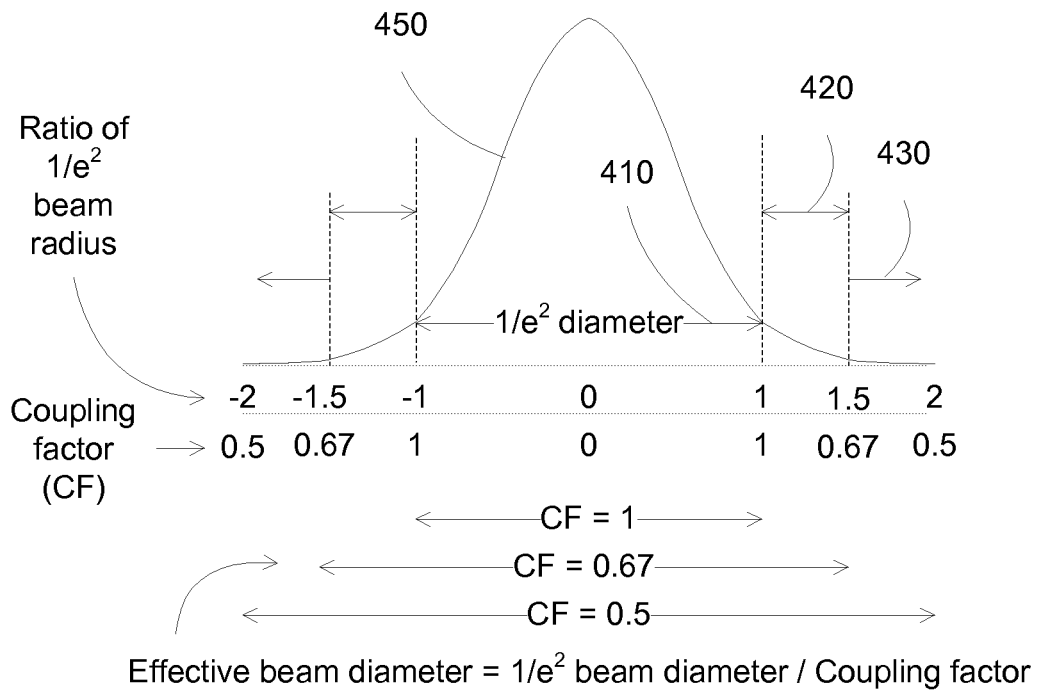
FIGS. 4A-4B illustrates a laser power density profile according to some embodiments.
Figure 4B:
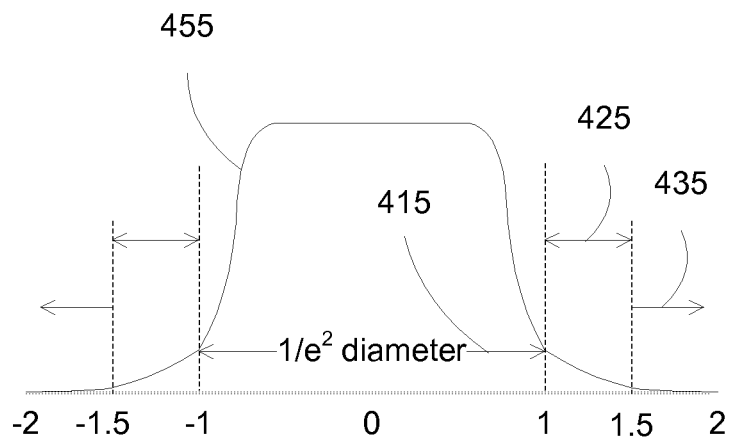

FIGS. 4A-4B illustrates a laser power density profile according to some embodiments. The graph shows a relationship between the laser power as a function of distance. The laser profile shown has a gaussian profile 450, e.g., a laser density that is maximized at a center of the laser beam, and exponentially reduced at distances away from the center of the laser beam. A width 410 of the laser beam can be defined as the beam area having $1/e^2$ radius. From the gaussian profile, a $1/e^2$ laser beam containing about 87% of the laser power.

Thus by providing a nozzle having a nozzle opening of $1/e^2$ to accommodate a laser beam, 87% of the laser power is transmitted through the nozzle, with the remaining power (e.g., 13%) impacting the nozzle material, such as the top portion or the sidewall of the nozzle. The high power of the remaining portion of the laser beam can potentially cause damage to the nozzle, leading to a reduced lifetime of the nozzle, and the failure of the liquid guided laser system.

For a laser beam area that is 50% larger than the $1/e^2$ beam radius, e.g., a beam area having radius with 1.5 times the $1/e^2$ beam radius, much more laser power, e.g., about 99%, is included in the laser beam area, leaving small power (1%) to impact the nozzle top portion.

In some embodiments, a buffer area 420 can be introduced, which can enlarge the laser beam from $1/e^2$ beam radius to 1.5× the $1/e^2$ beam radius. The buffer area can represent the area having 99% of the power of the laser beam. Thus for a typical 100 W laser, using a beam radius at safe area 430 larger than the buffer area 420, 1 W or less of laser power can impact the nozzle top portion, reducing potential damage to the nozzle.

In some embodiments, an effective laser beam diameter (or radius) can be introduced, which includes the standard $1/e^2$ beam diameter or radius, together with the buffer area. The effective laser beam width can represent a laser beam width that contains higher than 87% of the laser power (which is for the $1/e^2$ beam width). For example, a 1.5 effective laser beam width can contain 99% of the laser power, since the laser beam width is 1.5× larger than the $1/e^2$ beam width.

Different sizes of the buffer area 420 can be used, such as greater than 1× of the $1/e^2$ beam radius, for example, depending on the laser power and the laser damage threshold of the nozzle. The different sizes of buffer areas can result in different effective laser beam width, e.g., effective laser beam diameter or radius. Thus in some embodiments, the present invention introduces effective laser beam width (or diameter or radius), that is different from the $1/e^2$ beam width. For example, a 1.2 effective laser beam width can have a width of 1.2× the width of the $1/e^2$ beam width, resulting in about 6% laser power at the tail end, which can impact the nozzle material.

The buffer area and the effective laser beam width can be used to assess the portion of the laser power impacting the nozzle. For example, for a 50 W laser, the buffer area (and the effective laser beam width) can be smaller than 1.5×, e.g., at a ratio of 1.4× that the laser power of the tail end is still 1 W, e.g., 2% of the laser power. Similarly, for a 100 W laser used on a nozzle having laser damage threshold of 2 W, the buffer area (and the effective laser beam width) can be about 1.4×, e.g., at a ratio that the laser power of the tail end is 2 W, e.g., 2% of the laser power. Alternatively, for a 100 W laser used on a nozzle having laser damage threshold of 0.5 W, the buffer area (and the effective laser beam width) can be greater than 1.5×, e.g., at a ratio of about 1.6× that the laser power of the tail end is 0.5 W, e.g., 0.5% of the laser power.

In some embodiments, a coupling factor can be introduced, which represents a ratio of a standard laser beam width and the nozzle diameter. The laser beam width can be characterized as the $1/e^2$ radius, or can be any other beam with characterization, such as full width at half maximum beam width.

The coupling factor can be viewed as the ratio of the $1/e^2$ beam width (or diameter or radius) over the effective beam width (or diameter or radius). For example, for a buffer area of 1.5, e.g., from 1× of $1/e^2$ beam width to 1.5× of $1/e^2$ beam width, the effective beam width is 1.5× of $1/e^2$ beam width, and the coupling factor is 1/1.5, which is about 0.67.

Thus the coupling factor can have the same meaning as the effective laser beam width or the buffer area, which represents a portion of the laser beam that can pass through the nozzle opening.

In some embodiments, the laser focal plane can be coupled as far as possible below the nozzle inlet to avoid high energy introduced to the protection window. At the same time, high energy levels should be prevented from impacting the nozzle inlet. For example, for a typical nozzle material, energy levels of about 1% or less (or 1 W or less) can touch the nozzle stone. This requirement allows a laser beam having 1.5× or larger of the $1/e^2$ radius, providing a coupling factor of 1/1.5=0.67 or less.

In the above description, a Gaussian laser profile is used. However, the present invention is not limited to Gaussian profile laser beam, and can include non-Gaussian profile laser beams. There are special cases, where the laser energy distribution is altered (re-arranged) to form a non-Gaussian profile. An example of a non-Gaussian beam is the TopHat laser profile 455 in which the energy of the Gaussian laser beam by means of optical elements is re-arranged to form a flat intensity profile (reduced peak intensity, but a flat "top-hat" profile). Such energy re-arrangement is performed using the $1/e^2$ Gaussian laser beam diameter. In consequence the calculation of the CF (Coupling Factor) for such non-Gaussian beam remains the same and refers to the $1/e^2$ energy level, including $1/e^2$ beam diameter 415, buffer area 425, and safe area 435.

In some embodiments, the present invention discloses providing a nozzle opening that can accommodate a larger power portion of a focused laser beam (low coupling factor), or providing a laser beam having narrower beam width (high effective laser width). For example, a laser beam having $1/e^2$ radius, e.g., 87% laser power in a beam radius of $1/e^2$, can be focused to a portion of the nozzle opening. For example, for a nozzle opening of 80 microns, the laser beam can be filled out the nozzle inlet to the whole 80 micron opening, leading to 13% of the laser power impacting the nozzle sidewall and top portion. The $1/e^2$ laser beam can be reduced to a middle area of the nozzle opening, such as about 53 microns in the center of the nozzle opening. Thus the laser beam profile can have an effective laser beam width of 1.5× (or have a buffer area of 50%, or have a coupling factor of 0.67) passing through the 80 micron nozzle opening. Thus about 1% power density can impact the nozzle material, leading to better reliability and lifetime for the nozzle.

In some embodiments, the present invention discloses providing a nozzle opening that can accommodate a larger power portion of the laser beam, such as a nozzle opening that can allow passing a laser having radius of buffer area.

The nozzle opening that can accommodate the laser beam can include a nozzle having large diameter, e.g., a physical nozzle configuration that can allow a large portion of the laser beam. For example, the nozzle can have an inlet opening that is wider than multiple laser beam width, so that the power level at the sidewall of the nozzle is low.

Alternatively, the nozzle opening that can accommodate the laser beam can include a laser beam having narrow beam width. Instead of enlarging the nozzle dimension, the effect can be achieved by narrowing the width of the laser beam. For example, a laser beam width can be characterized at $1/e^2$ radius, e.g., at the location that the intensity of the laser beam reduces to $1/e^2$ (~0.135) of the maximum intensity. The nozzle diameter can be the same as the laser beam width, can be twice the laser beam width, or can be any factor of the laser beam width.

Figure 5A:
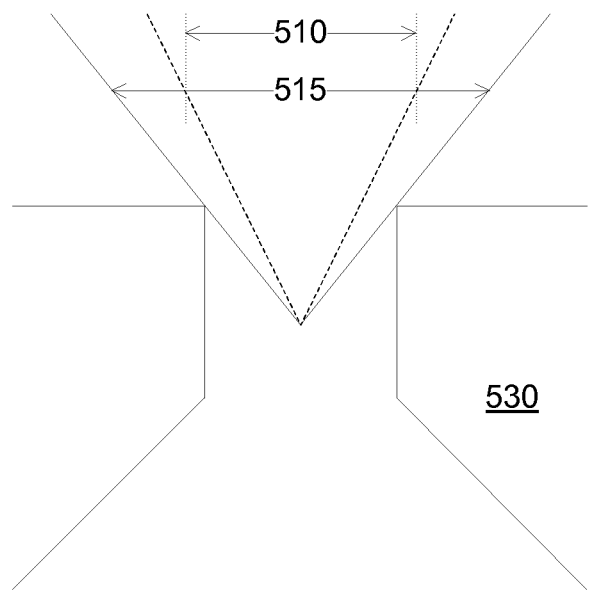
FIGS. 5A-5B illustrate laser beam configurations focusing to a nozzle opening according to some embodiments.
Figure 5B:
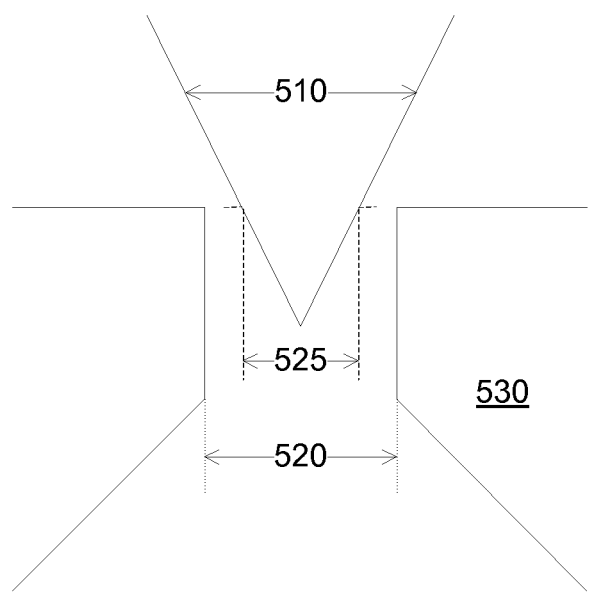

FIGS. 5A-5B illustrate laser beam configurations focusing to a nozzle opening according to some embodiments. A laser beam profile and a nozzle opening can be configured to allow minimum damages to the nozzle material.

In FIG. 5A, a narrow laser beam 515, e.g., laser beam with high effective laser beam width, can be focused to the nozzle 530, with the edges of the laser beam 515 touching the nozzle corners. The effective laser beam width can be larger than the standard $1/e^2$ laser beam width 510, thus a small portion of the laser beam 515 can impact the nozzle material, due to the low power of the tail end of the laser profile. Thus a narrow laser beam 515 can improve a lifetime performance of the nozzle, due to the low power impacting the nozzle material.

Using the effective laser beam concept, the geometric ray configuration of the laser beam can still be used, e.g., the geometric rays of the laser beam 515 can be analyzed touching the nozzle corner, with any desired amount of power impacting the nozzle top portion.

In some embodiments, the laser beam profile passing through the nozzle can be characterized based on a coupling factor. The coupling factor can represent a portion of an inlet opening of the nozzle for passing a standard laser power density profile. For example, if the nozzle opening is configured for a standard laser power density profile, such as a $1/e^2$ radius laser beam, then the coupling factor is 1. If the standard laser power density profile is configured to be confined in only a center portion of the inlet opening, then the coupling factor is less than 1, such as a ratio of the center portion to the inlet opening.

The coupling factor can be less than 1. The coupling factor can be greater than 0.2, greater than 0.3, greater than 0.4, or greater than 0.5. In some embodiments, the coupling factor can be determined by a desired reliability, such as the nozzle lifetime, or the laser power portion impacting the nozzle material. For example, the portion of the laser power density profile impacting the nozzle can be selected to be less than 1%, less than 2%, less than 5%, less than 10%, or less than 1 W, less than 2 W, less than 5 W, or less than 10 W.

In FIG. 5B, the relationship between the laser beam and the nozzle geometry can be characterized based on an effective inlet opening of the nozzle. An actual inlet opening 520 of the nozzle is the geometric dimension of the inlet opening, while the effective inlet opening 525 can represent an opening of the nozzle for passing a standard $1/e^2$ laser power density profile. For example, if the nozzle opening is configured for a standard laser power density profile, such as a $1/e^2$ radius laser beam, then the effective inlet opening is the same as the geometric inlet opening. If the standard laser power density profile is configured to be confined in only a center portion of the inlet opening, then the effective inlet opening is the portion of the inlet opening that allows passing of the standard laser power density profile.

In some embodiments, the present invention discloses methods for configuring parameters of a liquid-jet guided laser system, including selecting a coupling factor, e.g., selecting an amount of laser power impacting the nozzle, which relates to selecting a desired lifetime performance of the nozzle.

The coupling factor can be selected based on a power input requirement for a job. For example, to cut a thick material, a high laser power can be required, for example, to melt and evaporate the material. However, a high laser power can potential damage the nozzle, for example, due to a high power of a tail end of the laser profile impacting the nozzle. In some embodiments, the present invention discloses selecting an appropriate coupling factor, e.g., selecting an appropriate power amount impacting the nozzle of the liquid-jet guided laser system, to minimize or to prevent damage to the nozzle. For example, a low coupling factor can be chosen so that the amount of power reaching the nozzle top surface, e.g., not passing through the nozzle inlet opening, can be lower than a laser damage threshold for the nozzle.

The coupling factor can be selected based on a lifetime performance of the nozzle. For example, a nozzle can be rated for a laser damage threshold. Appropriate coupling factor can be selected, depending on the laser power input, so that the power of the laser beam impacting the nozzle does not exceed the damage threshold.

In some embodiments, the present invention discloses using a coupling factor to represent a damage effect to the nozzle. High value of coupling factor can lead to high value of laser power impacting the nozzle, leading to high potential damage and lower lifetime performance of the nozzle.

Low coupling factor can represent a buffer area surrounding the laser beam, ensuring that the laser beam profile can pass through the nozzle opening with minimal power at the edges of the profile. For example, with a buffer area of 50% larger than the $1/e^2$ radius, 99% of the laser power can pass through, leaving about 1% of the power to impact the nozzle material. The low impact power of the laser, e.g., less than 1%, can significantly extend the lifetime of the nozzle, leading to high reliability of the liquid guided laser system. In some embodiments, a power level can be used, such as a buffer radius that allows less than 1 W (instead of 1% of laser power) to impact the nozzle material.

In general, depending on the materials, less than 1%, less than 2%, or less than 5% of the laser power can be allow to impact the nozzle material. In addition, less than 1 W, less than 2 W, or less than 5 W of the laser power can be allow to impact the nozzle material. The lower power or power percentage, the higher lifetime of the nozzle can be obtained. In some embodiments, shorter lifetime can be selected, for example, to accommodate other design considerations, such as higher power for the cutting job while considering economical aspects of the nozzle lifetime for such job.

In some embodiments, the present invention discloses methods to protect the nozzle from the laser beam, for example, by setting a focus of the laser beam to be as far as possible from the protection window. The large focus distance, e.g., the large distance from the protection window to the focus point, can result in large laser spot size on the protection window and less reflective laser power impacting the nozzle sidewall. The large spot size can lead to a better lifetime performance of the protection window. Lower laser power impacting the nozzle sidewall can lead to a better lifetime performance of the nozzle.

Different characteristics of the optical system can be used to achieve the large focus distance. For example, the focus cone angle and/or the numerical aperture of the optical assembly can be as small as possible.

FIGS. 6A-6B illustrate different mechanisms for large focus distances according to some embodiments. In FIG. 6A, the focus lens 690 can be moved 640 closer to the protection window 670, so that the laser focus point can be moved from location 650 to 651. The laser focus point, or the laser focus distance from the protection window 670, can be characterized by a coupling point 681 or 682, which is the distance from the inlet plane 680 of the nozzle 630 to the focus point 650 or 651. By increasing the coupling point, e.g., from 681 to 682, the laser spot size on the protection window 670 can increase, leading to lower damage to the protection window. Further, increasing the coupling point, e.g. focus further away from and below the inlet plane can avoid the reflection laser beam from impacting the nozzle sidewall, e.g., at 610, leading to lower damage to the sidewall of the nozzle.

Thus, in some embodiments, the present invention discloses changing the focus point of the laser beam to increase the coupling point, which can lead to better lifetime for the protection window and the nozzle. The coupling point can be set to a maximum value, after taking into account other performance considerations, such as damages to the nozzle top portion.

In FIG. 6B, different optical assemblies can be used to change the focus point of the laser beam. For example, optical assembly 693 can have a focus cone angle $\theta_1$ (with focus point 653), and optical assembly 694 can have a focus cone angle $\theta_2$ (with focus point 654). By replacing the optical assembly 693 with the optical assembly 694, the focus point can change from focus point 653 to focus point 654. The coupling point can increase from coupling point 683 to coupling point 684, which can offer similar advantages as above.

The low coupling point, e.g., the large focus distance from the nozzle inlet plane, or the focus point farther from the protection window, can be related to the focus cone angle $\theta$, or the numerical aperture value NA, which can be defined as being related to the focus cone angle $\theta$, $NA = n \sin \theta/2$, with n being the refractive index of the medium, e.g., the liquid forming the liquid jet in which the focus cone propagates.

In some embodiments, the present invention discloses focusing the laser beam as deep as possible, while making the focus cone angle $\theta$, or the numerical aperture value NA, as large as possible.

In some embodiments, the present invention discloses methods to protect the top portion of the nozzle from the laser beam, for example, by reducing the width of the laser beam coming to the nozzle inlet opening, resulting in less laser power impacting the nozzle material at the top portion of the nozzle. The low laser impacting the nozzle top portion can lead to a better lifetime performance of the nozzle.

Different characteristics of the optical system can be used to achieve the small laser beam width. For example, the focus cone angle and/or the numerical aperture of the optical assembly can be as small as possible.

Figure 7A:
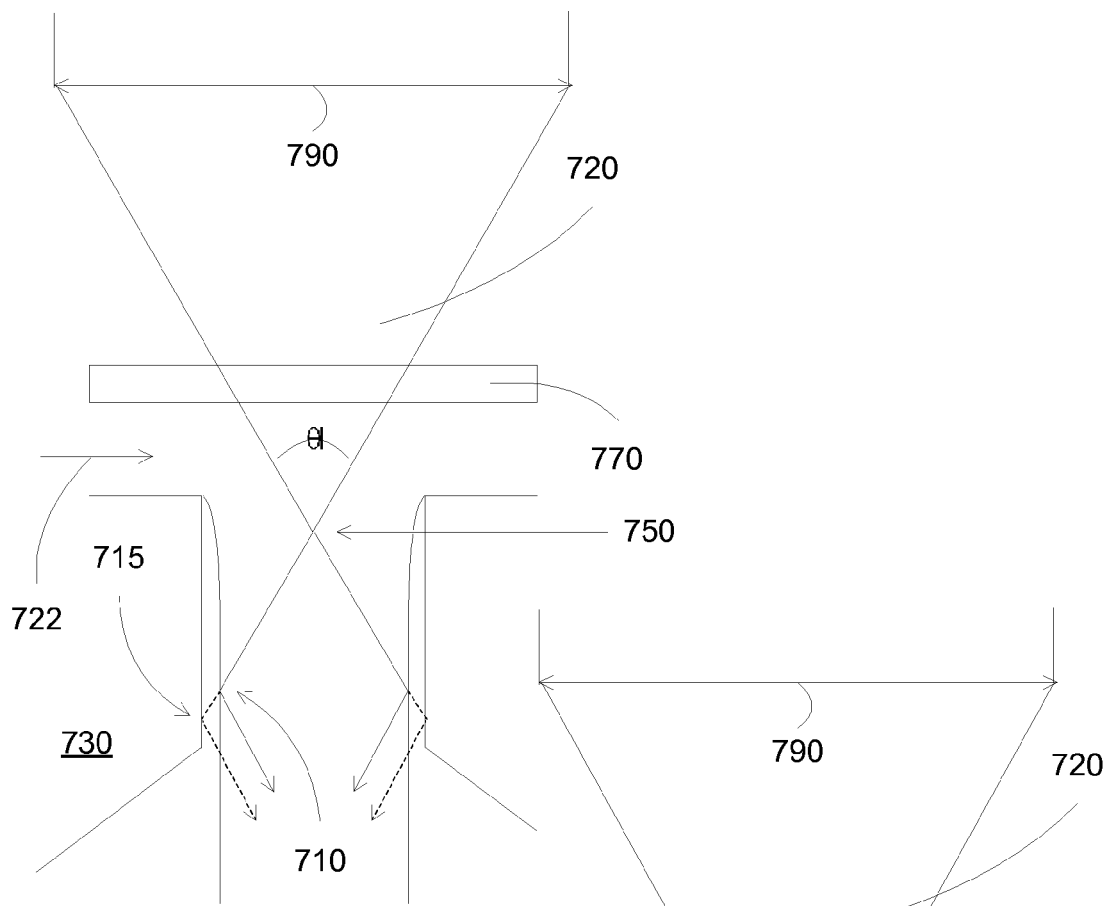
FIGS. 7A-7B illustrate potential damages to a nozzle sidewall according to some embodiments.
Figure 7B:
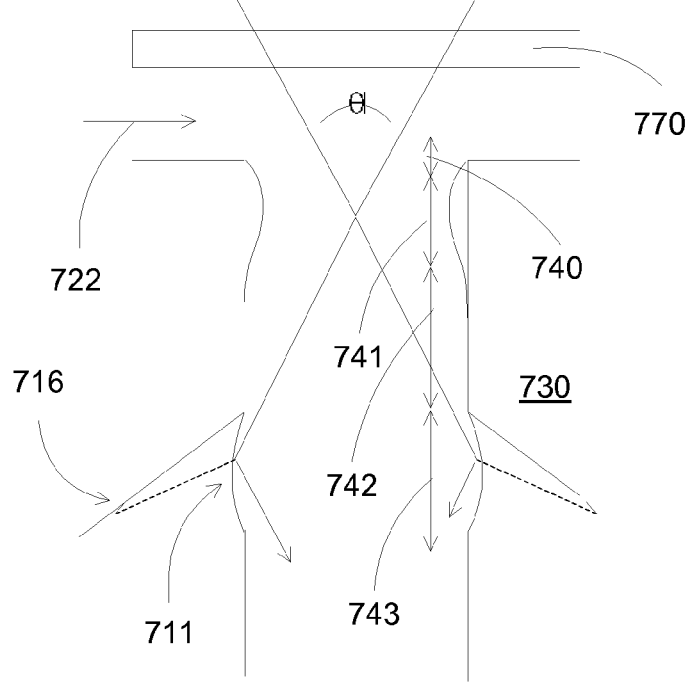

FIGS. 7A-7B illustrate potential damages to a nozzle sidewall according to some embodiments. A laser beam can be focused to the liquid area confined by the nozzle. If the focus point is high, e.g., small coupling point as discussed above, the laser beam can be reflected from the sidewall of the nozzle. Thus a large coupling point can be used to reduce or avoid damages to the nozzle sidewall. The high coupling point can be characterized by a deep focus point, e.g., a focus point far away from the protection window or a focus point far from the nozzle inlet plane. The high coupling point can be characterized by a small focus cone angle $\theta$ or a small numerical aperture value. For an optical assembly having a same focus cone angle $\theta$ or a same numerical aperture value, the focus lens can be moved toward the protection window to focus the laser beam to a point far from the protection window.

FIG. 7A shows a potential damage to a nozzle sidewall due to a laser reflection beam. A laser beam 720 can be focused by a focus lens 790, passing a protection window 770 to be focused on a focus point 750. If the focus point 750 is shallow, e.g., near the protection window 770, the laser beam can escape the liquid boundary 710 to impact a sidewall 715 of the nozzle 730.

In theory, the laser beam can be internally reflected from the boundary 710 of the liquid jet 722, with no power impacting the nozzle sidewall. However, in practice, due to variations of the liquid jet formation, a portion of the laser beam can pass through the liquid boundary 710 to impact the nozzle sidewall 715, potentially causing damage to the nozzle sidewall. This effect can be observed by the early failure of the nozzle in liquid-jet guided laser system having shallow focus point.

In some embodiments, the present invention discloses methods to limit the amount of laser power impacting a sidewall portion of the nozzle to improve a lifetime performance of the nozzle. The methods can include maximizing a focus point of the laser beam toward the liquid jet, for example, so that the first reflection occurs away from the nozzle sidewall. The focal point of the laser beam can be as deep as possible to prevent reflection at the nozzle sidewall, while still satisfying other considerations, such as protecting the protection window and protecting the top portion of the nozzle.

By focusing the laser beam below the nozzle inlet plane, the laser reflected beam can occur outside of the nozzle, preventing potential damages to the nozzle sidewall.

In some embodiments, the laser focus can be farther away from the nozzle inlet plane toward the liquid jet to further lower the reflection area. For example, at immediate area near the exit plane, the liquid jet can experience instability, due to the sudden expansion from the nozzle outlet. A laser reflection at this unstable liquid jet area can pass through the liquid boundary to impact on the bottom portion of the nozzle, potentially causing damages.

FIG. 7B shows a potential damage to a nozzle sidewall due to a laser reflection beam. A laser beam can be focused by a focus lens 790, passing a protection window 770 to be focus on a focus point. If the focus point is shallow, e.g., near the protection window 770, the laser beam can escape the liquid boundary 711 to impact a bottom portion 716 of the nozzle 730.

In theory, the laser beam can be internally reflected from the boundary 711 of the liquid jet 722, since the liquid jet can form a laminar flow after exiting the nozzle opening. However, in practice, due to variations of the liquid jet formation, a portion of the laser beam can pass through the liquid boundary 711 to impact the nozzle bottom portion 716, potentially causing damage to the nozzle.

In some embodiments, the present invention discloses a liquid jet formation and its hydraulic fundamentals to provide a suitable starting point for the total internal reflection of the laser beam inside the liquid jet. Inside the nozzle there can be 4 different zones. The entry zone 740 in which fluid is pressed over and into the nozzle cavity inlet. The cavitation zone 741 in which the instable hydraulic flip can occur. The expansion zone 742 in which the liquid jet expands to the diameter of the nozzle cavity. The exit zone 743 below the nozzle outlet. At the exit zone 743, a small turbulence can occurs before the liquid jet reaches its final diameter and forms a laminar flow with a clear boundary layer between the liquid jet and the ambient environment, which is needed to enable internal reflection of the laser beam. Thus a reflection at the exit zone can potential damage the nozzle sidewall, since a certain amount of laser beam can escape the turbulence boundary to impact on a bottom portion 716 of the nozzle.

In some embodiments, the present invention discloses methods to limit the amount of laser power impacting a bottom portion of the nozzle to improve a lifetime performance of the nozzle. The methods can include providing a deep focus point of the laser beam toward the liquid jet, for example, so that the first reflection occurs beyond the unstable liquid jet portion, e.g., at the laminar flow portion of the liquid jet.

In some embodiments, the present invention discloses methods and systems to characterize a potential damage to the nozzle sidewall or bottom portion. If a portion of the laser beam escapes the liquid boundary, the total power following the liquid jet is less than the power generated from the laser source. Thus, by measuring the laser power at the liquid jet outlet, the amount of laser power loss can be calculated. This power loss can cause damages to the nozzle sidewall or bottom portion. Deeper focus point, e.g., larger coupling point, can be used to reduce the power loss, and also to reduce damages to the nozzle.

A power meter can be placed at the bottom of the liquid jet, intercepting the liquid jet stream. The power meter can be configured to measure the power delivered by the liquid jet. The amount of power loss can be calculated from the power generated from the laser source and the measured power. The power loss can be partially attributed to the laser beam escaping the liquid jet, which can cause damages to the nozzle. There can be other laser loss, such as laser power loss occurring in the optical system above the coupling unit.

In some embodiments, a power meter can be used to measure effectively the best coupling point, for example, highest transmitted power can result in best coupling point.

Figure 8:
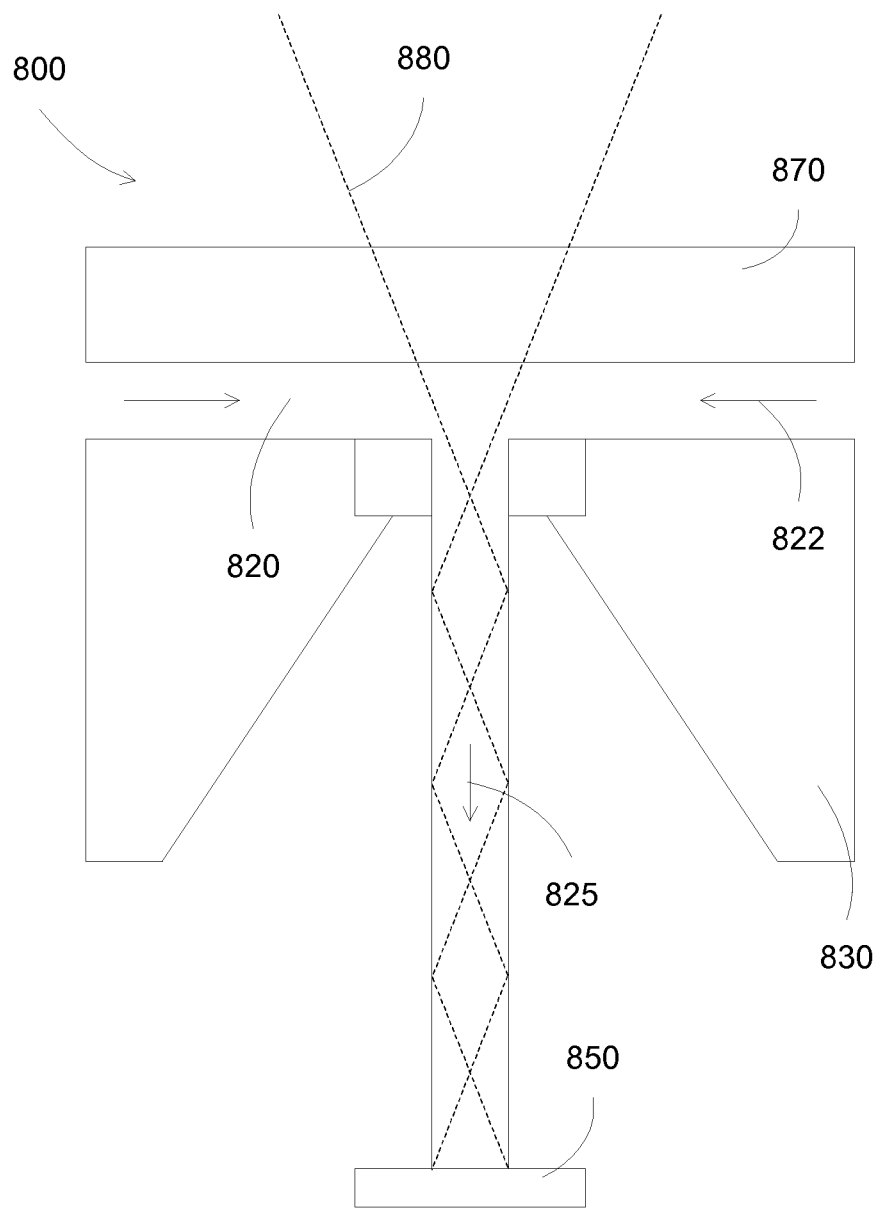
FIG. 8 illustrates a schematic for measuring power delivered by the liquid jet according to some embodiments.

FIG. 8 illustrates a schematic for measuring power delivered by the liquid jet according to some embodiments. A power meter can intercept the liquid jet to measure power transmitted by the laser beam. The measured laser power can be compared with the power delivered by the laser source to identify potential power loss, which can cause damage to the nozzle. A liquid-jet guided laser system 800 can include a chamber 820, which is configured to guide a liquid flow 822. The chamber 820 can include an opening for direct the liquid flow to form a liquid jet 825. A nozzle 830 can be used to control the size of the liquid jet 825. A protection window 870 is included to separate the dry environment of the laser beam 880 from the liquid environment of the liquid jet 825. The laser beam 880 can be confined in the liquid jet 825 due to internal reflection.

A power meter 850 can be disposed to intercept the liquid jet 825. The power meter 850 can be operable to measure the laser power reflected inside the liquid jet. The power amount measured by the power meter 850 should be maximized, e.g., relative power measurements can be used to optimized the coupling point, which can occur at highest power transmittance of the laser in the liquid-jet.

In some embodiments, the present invention discloses using a power meter for assessing potential damages to the liquid-jet guided laser system, such as damages to the nozzle sidewall or bottom portion, due to the power escaped from the liquid jet.

In some embodiments, the power meter can be used to assess the location of the laser focus, and to assess potential damages to the nozzle. The laser focus can be adjusted, e.g., lowering the laser focus toward the liquid jet, to reduce the power loss and to reduce damage to the nozzle.

In some embodiments, the present invention discloses a relationship linking performance of a liquid jet guided laser system with its setting parameters. The relationship can provide a link between various system parameters, such as the characteristics of the laser beam and the optical assembly, together with the geometry and material of the liquid jet guided laser system. The laser beam characteristics can include the laser beam density profile and the laser power, which can be simplified to a coupling factor parameter related the laser beam width. The optical assembly characteristics can include the spreading and focusing of the laser beam, which can be simplified to a focus cone angle of a focus lens for focusing the laser beam in the nozzle inlet opening, and a focus point of the laser beam (e.g., a coupling point parameter). The geometry characteristics can include the nozzle geometry, which can simplified to the nozzle diameter and depth. The material characteristics can include the liquid characteristics, such as the index of refraction of the liquid. The focus cone angle and the index of refraction can be combined in a numerical aperture parameter.

The parameters in the relationship can be viewed as system setting parameters, or can be viewed as system performance parameters. For example, the parameter of numerical aperture can represent the characteristic of the optical assembly in the liquid jet guided laser system. Thus, the numerical aperture can be a fixed parameter, to be used for configure and evaluating other parameters. In addition, this parameter of numerical aperture can represent a performance criterion for the protection window. Thus, the numerical aperture can be a variable, which can be changed to obtain a desired or optimum performance, e.g., lifetime reliability for the protection window of the liquid jet guided laser system. Similarly, the coupling factor and focus point can be variables for obtain lifetime performance for the nozzle.

For example, a cutting job can require a certain high laser power, for example, for material or throughput requirements. The relationship can be used, which can provide a value for the numerical aperture, to satisfy both the cutting performance and the reliability performance.

The current numerical aperture of the liquid jet guided laser system can be considered under the job requirements. If the current numerical aperture is adequate, e.g., providing an acceptable lifetime performance for the components of the liquid-jet guided laser system under the requirements to perform the job, then the current optical assembly can be used for the job. For example, for a given laser power requirement, the current numerical aperture can provide that the laser power density passing through the protection window does not exceed a laser damage threshold of the protection window, or that a portion of the laser beam impacting the nozzle top portion, sidewall, or bottom portion does not cause damage to the nozzle.

If the current numerical aperture is not adequate, e.g., outside the range of the calculated numerical aperture, then a new optical assembly can be used to provide the appropriate numerical aperture.

Similarly, the coupling factor and the focus point can be evaluated and configured to satisfy the job requirements.

In some embodiments, the present invention discloses methods, and system resulted from the methods, for optimizing the operations of a liquid-jet guided laser system. The methods can link the parameters of the liquid-jet guided laser system in a way to achieve maximum performance (e.g., power transferred to the work piece) and maximum reliability (e.g., minimum laser power impacting the protection window and the nozzle). For example, increasing the focus cone angle of the laser beam can reduce damage to the protection window. Increasing the coupling factor of the laser beam can reduce damage to the nozzle. Increasing the focus point (e.g., increasing the coupling point) of the laser beam can reduce damage to the nozzle and allow high power transfer.

Figures 9A, 9B:
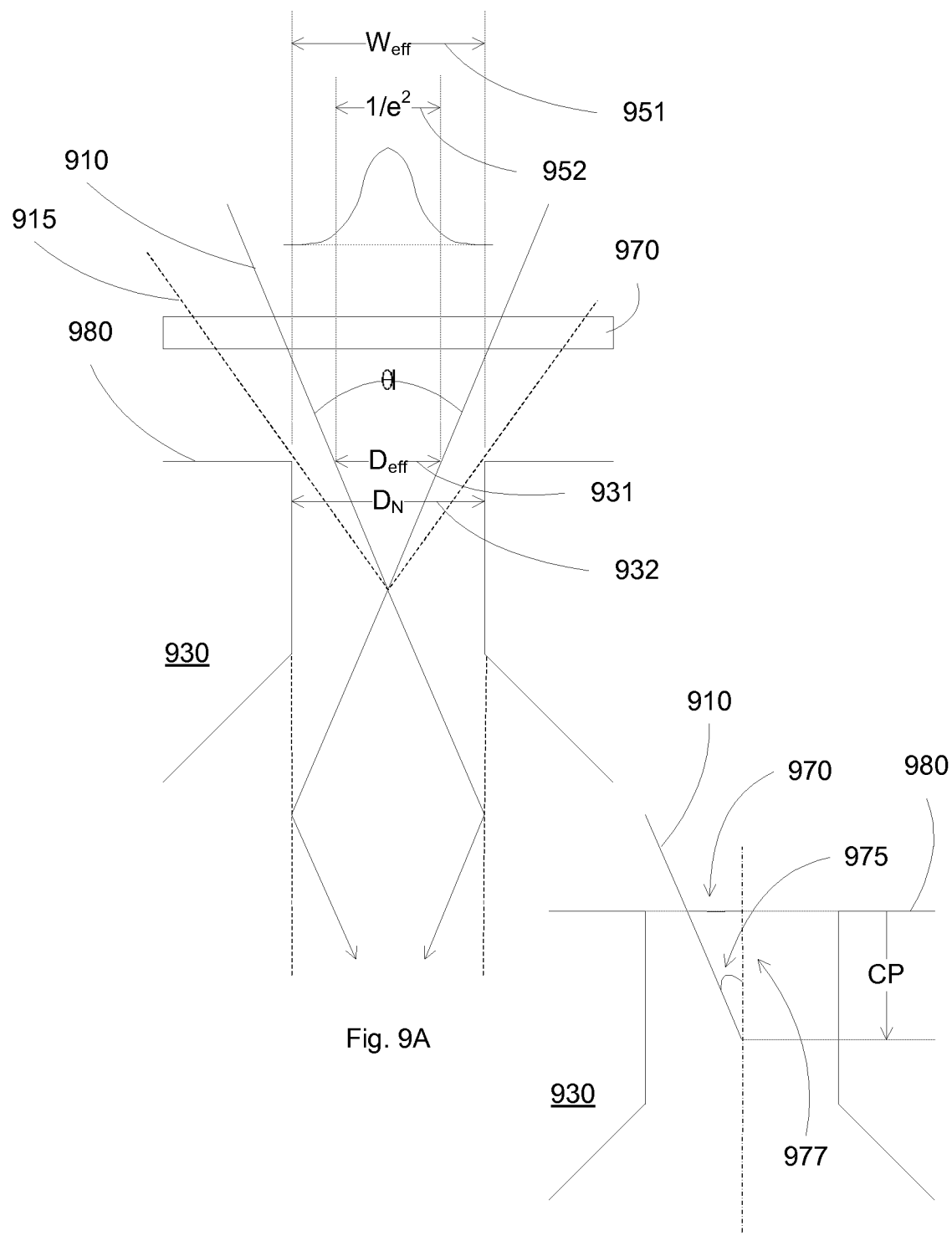
FIGS. 9A-9B illustrates a relationship between a focus point and the nozzle configuration according to some embodiments.

FIGS. 9A-9B illustrates a relationship between a focus point and the nozzle configuration according to some embodiments. A laser beam, represented by geometric rays 910 as the boundary of the $1/e^2$ laser beam width 952, can be focused on the opening of a nozzle 930. A coupling factor CF can be used, resulting in an effective laser beam width 951 $W_{eff}$, which is the ratio of the $1/e^2$ laser beam width 952 with the coupling factor CF. The effective laser beam can be represented by geometric rays 915, which is larger than the $1/e^2$ geometric rays 910 by a buffer region.

The nozzle can have an opening having diameter 932 $D_N$. An effective nozzle diameter 931 $D_{eff}$ can be used, to use the $1/e^2$ laser beam width 952 instead of the effective laser beam width 951. The effective nozzle diameter 931 can be related to the geometry nozzle diameter 932 by the coupling factor CF, $D_{eff} = CF*D_N$.

The laser focal plane, also referred to as Coupling Point (CP), is located below the nozzle inlet plane 980 to ensure that total internal reflection of the laser beam starts below the nozzle exit and the laser spot on the laser protection window is as large as possible. The actual coupling point at a given Numerical Aperture (NA) is dependent on the Coupling Factor (CF) as well as the nozzle diameter ($D_N$).

The relationship between the coupling point CP 977, the focus cone angle θ 975, the nozzle geometry $D_N$ 932, and the coupling factor CF (or half the effective diameter $D_{eff}$ 970) can be mathematically described as follows. First of all we derive the angle of the half cone as follows based on equation:

$$\tan\left(\frac{\theta}{2}\right) = \frac{CF \cdot D_N / 2}{CP}$$

The coupling point CP can be calculated as:

$$CP = \frac{0.5 \cdot CF \cdot D_N}{\tan(\theta/2)}$$

In some embodiments, the relationship between the parameters of the liquid jet guided laser system can be $$CP = \frac{0.5 \cdot CF \cdot D_N}{\tan(\arcsin(NA/n))},$$

with NA being a numerical aperture of the lens, and n being an index of refraction of the liquid at a wavelength of the laser beam. The parameters can use a laser power density profile, for example, in evaluating the coupling factor CF or the numerical aperture NA.

Other variations of the formula can be used, for example, a formula in which the geometric nozzle diameter $D_N$ is replaced with the effective nozzle diameter $D_{eff}$, $$CP = \frac{0.5 \cdot D_{eff}}{\tan(\theta/2)} \text{ or } CP = \frac{0.5 \cdot D_{eff}}{\tan(\arcsin(NA/n))}.$$

As an example, assuming a liquid-jet guided laser system has a 1064 nm laser, a focusing numerical aperture of 0.40, an 80 um nozzle and a coupling factor of 0.67. The coupling point is calculated to be 84 um below the nozzle inlet plane. The total internal reflection of the laser beam starts 211 um below the nozzle inlet plane, inside the laminar flow.

If we keep the nozzle diameter, the laser wavelength and the coupling factor that same, but only change the focusing numerical aperture to 0.60 (for example smaller focal length of the focusing lens), then the coupling point is reduced to 53 um below the nozzle inlet plane. The total internal reflection of the laser beam now starts 131 um below the nozzle inlet plane, inside the laminar flow This shows in a clear way that the methods can allow adjustments of the laser coupling point to each of the individual influencing parameters such as laser wavelength, laser power, the energy distribution in the laser beam, focal length and focus cone angle of the focusing lens as well as laser focus spot size.

Figure 10:
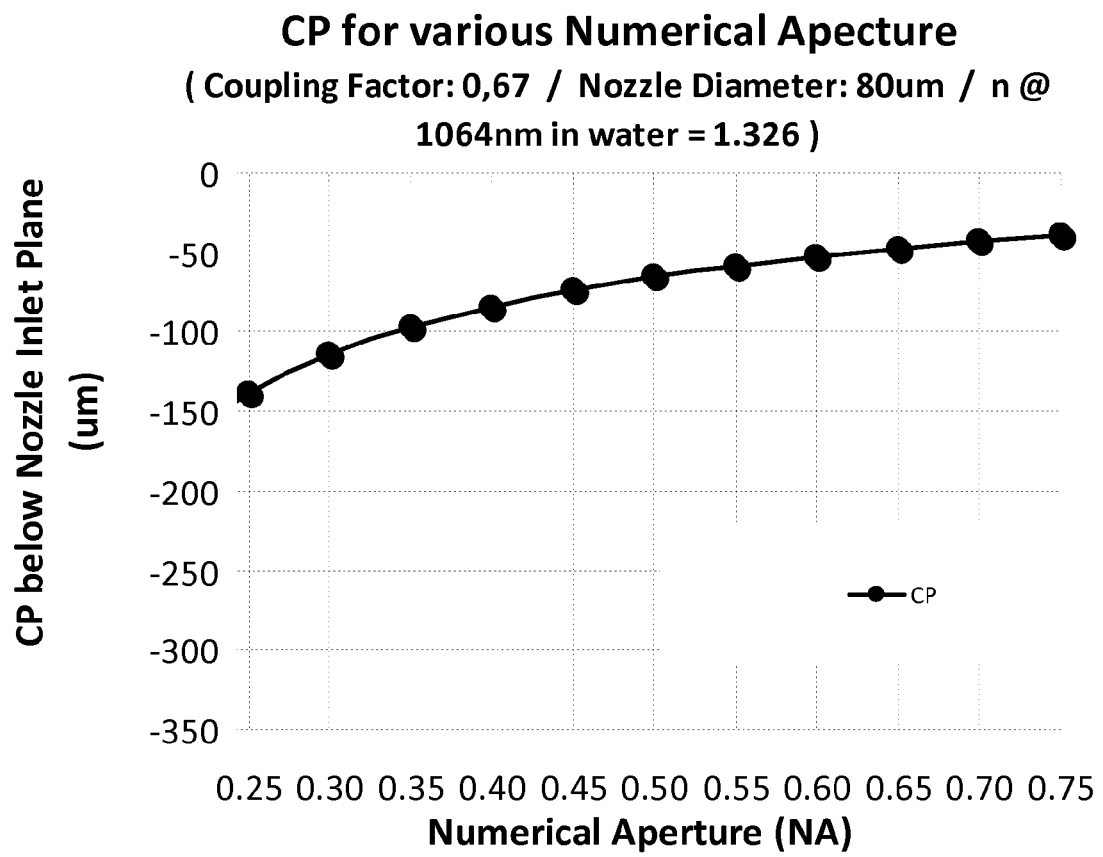
FIG. 10 illustrates the coupling point CP for an 80 um according to some embodiments.

FIG. 10 illustrates the coupling point CP for an 80 um nozzle diameter according to some embodiments. The coupling point, e.g., the focus point of the laser beam, can be seen to be between 40 um and 150 um below the nozzle inlet plane.

In some embodiments, the present invention discloses setting the focus point of the laser beam to be below the nozzle inlet plane, e.g., CP greater or equal to zero. The focus point can be less than twice the diameter of the nozzle, e.g., CP less than or equal to $2D_N$, with $D_N$ being the nozzle diameter.

$$0 \le CP \le 2D_N$$

In some embodiments, the present invention discloses setting the focus point of the laser beam to be below the nozzle inlet plane, e.g., CP greater than zero. The focus point can be less than twice the diameter of the nozzle, e.g., CP less than $2D_N$.

$$0 < CP < 2D_N$$

In some embodiments, the present invention discloses setting the focus point of the laser beam to be below the nozzle inlet plane, e.g., CP greater than a fraction of the nozzle diameter, such as greater than 0.1 $D_N$. The focus point can be less than 1.9 of the diameter of the nozzle, e.g., CP less than $1.9D_N$.

$$0.1D_N < CP < 1.9D_N$$

In some embodiments, the present invention discloses methods for configuring a liquid jet guided laser system using a relationship linking the performance and setting parameters of the liquid jet guided laser system. The relationship can be used as a guidance in setting the configurations of the liquid jet guided laser system for performing a job. For example, a cutting job can require a high laser power, which can damage the protection window or the nozzle if the maximum laser exposure of these components are not considered when configuring the system.

In some embodiments, the relationship can provide an optimum setting for the liquid jet guided laser system. The parameter space defined by the relationship can provide a balance between high power performance and long term reliability.

In addition, the relationship can be used as a guidance to change the system parameters toward the optimum performance and reliability, given the constraints of the jobs.

In some embodiments, the relationship can be used for setting the focus of the laser beam of the liquid jet guided laser system. Using the focus according to the relationship can provide an optimum performance for the liquid jet guided laser system, such as maximizing the lifetime performance of the protection window and nozzle.

In some embodiments, the relationship can be used for setting the numerical aperture of the liquid jet guided laser system. The numerical aperture can be related to the laser power density exposure on the protection window. Thus a value of numerical aperture can be suitable for a range of laser power, which provide a laser beam impacting the protection window with a power density below the laser damage threshold.

For jobs requiring a higher laser power, the numerical aperture can be evaluated and changed so that the laser beam impacting the protection window does not exceed the damage threshold of the protection window. The numerical aperture can be in the range between 0.25 and 0.75, with higher values indicating an increased lifetime for the protection window, due to the spreading of the laser beam through the protection window. For example, for low laser power, a low numerical aperture can be adequate, e.g., the laser exposure of the protection window is below the laser damage threshold. When a higher laser power is required, the low numerical aperture might not be adequate, and a new higher value can be used, calculated to ensure the lifetime performance of the protection window.

After setting the numerical aperture, other parameters can be set according to the relationship for optimum system performance. For example, the focus of the laser beam can be calculated from the relationship, giving an optimum setting of the laser focus, given, for example, the required numerical aperture.

In some embodiments, the relationship can be used for setting the coupling factor of the liquid jet guided laser system. The coupling factor can be related to the portion of the laser power impacting the nozzle. Thus a value of coupling factor can be suitable for a range of laser power, which provide a laser beam impacting the nozzle with a power level below the laser damage threshold.

The coupling factor can be any value, with lower values of coupling factor relate to lower laser power impacting the nozzle, thus providing better lifetime performance. In some embodiments, the coupling factor can be less than 1, since at coupling factor at 1, about 14% of the laser power can impact the nozzle material, which can exceed the laser damage threshold of the nozzle material. For high laser power, lower coupling factor values can be used, such as greater than 0.2, greater than 0.3, greater than 0.4 or greater than 0.5, depending on the level of laser power. For example, at coupling factor of 0.67, about 1% of the laser power can impact the nozzle material. This coupling factor value can be suitable for a range of laser power, such as 100 W laser, since about 1 W of laser power can impact the nozzle material. For higher laser power, a coupling factor that can provide about 1 W laser power to the nozzle can be used.

After setting the coupling factor, other parameters can be set according to the relationship for optimum system performance. For example, the focus of the laser beam can be calculated from the relationship, giving an optimum setting of the laser focus, given, for example, the required coupling factor.

In general, a lower value of coupling factor can provide better lifetime performance for the nozzle. However, a lower coupling factor can result in a shorter focus value, according to the optimum conditions dictated by the relationship. The shorter focus value can cause damage to the sidewall or bottom portion of the nozzle, thus a balance is needed between the coupling factor (which determines the damage to the top portion of the nozzle) and the focus point (which determines the damage to the sidewall and bottom portion of the nozzle). The balance point can be represented by the relationship, which can allow configuring the system for optimum performance.

For example, a high nozzle protection can be desired, dictating a low coupling factor. If the focus value, calculated from the given coupling factor according to the relationship, is appropriate, then the given coupling factor can be used for best protection. If the focus value of not appropriate, e.g., too small so that internal reflection can occur in the nozzle or at the unstable portion of the liquid jet, then a reconsideration of coupling factor is necessary, to balance the protection of the top portion of the nozzle (dictated by the coupling factor) with the sidewall and bottom portion of the nozzle (dictated by the focus value).

Alternatively, the focus value can be determined first, and the coupling factor can be calculated by the relationship. The given focus value and the calculated coupling factor can be iteratively assessed to achieve a balance for the lifetime performance of the nozzle.

In some embodiments, the present invention discloses a relationship between various parameters of the liquid jet guided laser system that can provide an optimum system performance. The relationship can allow an evaluation and trade-off between the various parameters while maintaining an optimum performance of the system.

In some embodiments, the present invention discloses methods for configuring a liquid jet guided laser system to meet a power requirement or a lifetime requirement, using a relationship linking the performance and setting parameters of the liquid jet guided laser system. After determining a power requirement, the parameters of the liquid jet guided laser system can be configured according to the relationship for optimum performance. In addition, different parameters can be considered for different performance issues.

For example, lifetime performance of the protection window can be obtained by setting appropriate numerical aperture. Lifetime performance of the nozzle can be obtained by setting appropriate coupling factor and focus point. The balance and trade-off between these performances can be provided by the relationship, ensuring overall optimum performance. In some cases, high lifetime performance for the protection window and nozzle can be achieved. In some cases, high lifetime performance for the protection window can be achieved, with lower lifetime performance for the nozzle. In some cases, high lifetime performance for the nozzle can be achieved, with lower lifetime performance for the protection window. In any case, the present invention discloses an overall optimum setting, e.g., configuring the liquid jet guided laser system, through the relationship.

In some embodiments, the parameters of the liquid jet guided laser system can be set to satisfy a power requirement. A numerical aperture can first be determined so that the high power laser beam does not impact the protection window with exposure exceeding the damage threshold of the protection window. The numerical aperture can be in the range between 0.25 and 0.75, with higher values indicating an increased lifetime for the protection window.

After setting the numerical aperture, other parameters can be set according to the relationship for optimum system performance. For example, the focus of the laser beam can be calculated from the relationship, giving an optimum setting of the laser focus, given, for example, the required numerical aperture.

In some embodiments, a coupling factor can first be determined so that the high power laser beam does not impact the nozzle with exposure exceeding the damage threshold of the nozzle. The coupling factor can be in the range between 0.2 (or 0.3, 0.4 or 0.5) and 1, with lower values indicating an increased lifetime for the nozzle.

After setting the coupling factor, other parameters can be set according to the relationship for optimum system performance. For example, the focus of the laser beam can be calculated from the relationship, giving an optimum setting of the laser focus, given, for example, the required coupling factor.

The process can be repeated, for example, to obtain a satisfactory focus point. For example, the coupling factor and the focus point are directly related, providing opposite effect in protecting the nozzle. Low value of coupling factor can provide better nozzle protection, but can lead to low coupling point, e.g., focus point closer to the nozzle inlet plane, which can cause damage to other part of the nozzle. Thus an iteration process can be used, in which a balance between the coupling factor and the focus point can be reached, which represents an optimum protection for the nozzle.

In some embodiments, the numerical aperture and coupling factor can first be determined. For example, the numerical aperture can be determined based on a desired lifetime performance of the protection window. The coupling factor can be determined based on a desired lifetime performance of the nozzle.

After setting the numerical aperture and coupling factor, other parameters can be set according to the relationship for optimum system performance. For example, the focus of the laser beam can be calculated from the relationship, giving an optimum setting of the laser focus, given, for example, the required numerical aperture and coupling factor. The process can be repeated, for example, to obtain a satisfactory focus point, e.g., an optimum setting for overall performance.

What is claimed is:

1. A method to configure a liquid-jet guided laser system, the method comprising setting parameters of the liquid-jet guided laser system based on a relationship between a focus point of a laser beam in the liquid-jet guided laser system, a focus cone angle of the laser beam, and an effective width of the laser beam based on the power density profile of the laser beam.

2. A method as in claim 1 wherein the focus cone angle is represented by a numerical aperture of a focus lens for the laser beam of the liquid-jet guided laser system.

3. A method as in claim 2 wherein the numerical aperture is selected to be between 0.25 and 0.75.

4. A method as in claim 1 wherein the effective width is represented by an effective diameter of a nozzle of the liquid-jet guided laser system.

5. A method as in claim 1 wherein the effective width is related to a power level impacting a nozzle of the liquid-jet guided laser system.

6. A method as in claim 5 wherein the power level is selected to be less than 5 W of the power input.

7. A method as in claim 1 wherein the relationship is proportional to $$\frac{0.5 \cdot CF \cdot D_N}{\tan(\arcsin(NA/n))},$$

wherein CF is a coupling factor representing a portion of an inlet opening of the nozzle for passing a standard laser power density profile,
wherein $D_N$ is a diameter of the nozzle,
wherein NA is a numerical aperture of a focus lens of the liquid-jet guided laser system, and
wherein n is an index of refraction of the liquid at a wavelength of the laser beam.

8. A method as in claim 1 wherein the relationship is proportional to $$\frac{0.5 \cdot D_{\textit{eff}}}{\tan(\arcsin(NA/n))},$$

wherein $D_{\textit{eff}}$ is an effective diameter of the nozzle,
wherein NA is a numerical aperture of a focus lens of the liquid-jet guided laser system, and
wherein n is an index of refraction of the liquid at a wavelength of the laser beam.

9. A method as in claim 1 wherein the relationship is proportional to $$\frac{0.5 \cdot CF \cdot D_N}{\tan(\theta/2))},$$

wherein CF is a coupling factor representing a portion of an inlet opening of the nozzle for passing a standard laser power density profile,
wherein $D_N$ is a diameter of the nozzle,
wherein $\theta$ is a focus cone angle of a laser beam of the liquid-jet guided laser system.

10. A method to configure a liquid-jet guided laser system, the method comprising
determining a power input of a laser beam of the liquid-jet guided laser system or a lifetime requirement of the liquid-jet guided laser system;
setting parameters of the liquid-jet guided laser system based on a relationship between a focus point of a laser beam in the liquid-jet guided laser system, a focus cone angle of the laser beam, and an effective width of the laser beam based on the power density profile of the laser beam.

11. A method as in claim 10 wherein setting parameters of the liquid-jet guided laser system comprises
determining a value for the numerical aperture to prevent damages to a protection window of the liquid-jet guided laser system;
calculating a focus point based on the relationship;
setting a focus of a laser beam of the liquid-jet guided laser system based on the focus point.

12. A method as in claim 10 wherein setting parameters of the liquid-jet guided laser system comprises
determining a value for the amount of the power input impacting the nozzle;

calculating a focus point based on the relationship;
setting a focus of a laser beam of the liquid-jet guided laser system based on the focus point.

13. A method as in claim 10 wherein setting parameters of the liquid-jet guided laser system comprises
determining a first value for an amount of the power input impacting a protection window of the liquid-jet guided laser system;
determining a second value for the numerical aperture to achieve the first value;
determining a third value for the amount of the power input impacting the nozzle;
calculating a focus point based on the relationship;
setting a focus of a laser beam of the liquid-jet guided laser system based on the focus point.

14. A method as in claim 10 wherein the numerical aperture is selected to be between 0.25 and 0.75.

15. A method as in claim 10 wherein the value for the amount of the power input impacting the nozzle is selected to be less than 5 W of the power input.

16. A method as in claim 10 wherein the relationship is proportional to $$\frac{0.5 \cdot CF \cdot D_N}{\tan(\arcsin(NA/n))},$$

wherein CF is a coupling factor representing a portion of an inlet opening of the nozzle for passing a standard laser power density profile,
wherein $D_N$ is a diameter of the nozzle,
wherein NA is a numerical aperture of a focus lens of the liquid-jet guided laser system, and
wherein n is an index of refraction of the liquid at a wavelength of the laser beam.

17. A method as in claim 10 wherein the relationship is proportional to $$\frac{0.5 \cdot CF \cdot D_N}{\tan(\theta/2))},$$

wherein CF is a coupling factor representing a portion of an inlet opening of the nozzle for passing a standard laser power density profile,
wherein $D_N$ is a diameter of the nozzle,
wherein $\theta$ is a focus cone angle of a laser beam of the liquid-jet guided laser system.

18. A method to configure a liquid-jet guided laser system, the method comprising
setting a focus point of a laser beam of the liquid-jet guided laser system to be greater than or equal to zero and less than or equal to twice a diameter of a nozzle of the liquid-jet guided laser system from an inlet plane of the nozzle.

19. A method as in claim 18 wherein the focus point is set to be greater than zero and less than twice a diameter of a nozzle of the liquid-jet guided laser system from an inlet plane of the nozzle.

20. A method as in claim 18 wherein the focus point is set to be between 0.1 and 1.9 of a diameter of a nozzle of the liquid-jet guided laser system from an inlet plane of the nozzle.

* * * * *